Sept. 7, 1943.   F. D. KNOBLOCK   2,329,059
DIFFERENTIAL MECHANISM
Filed June 2, 1942   2 Sheets-Sheet 1

Inventor
Frederick D. Knoblock.
By Cameron, Kerkam + Sutton
Attorneys

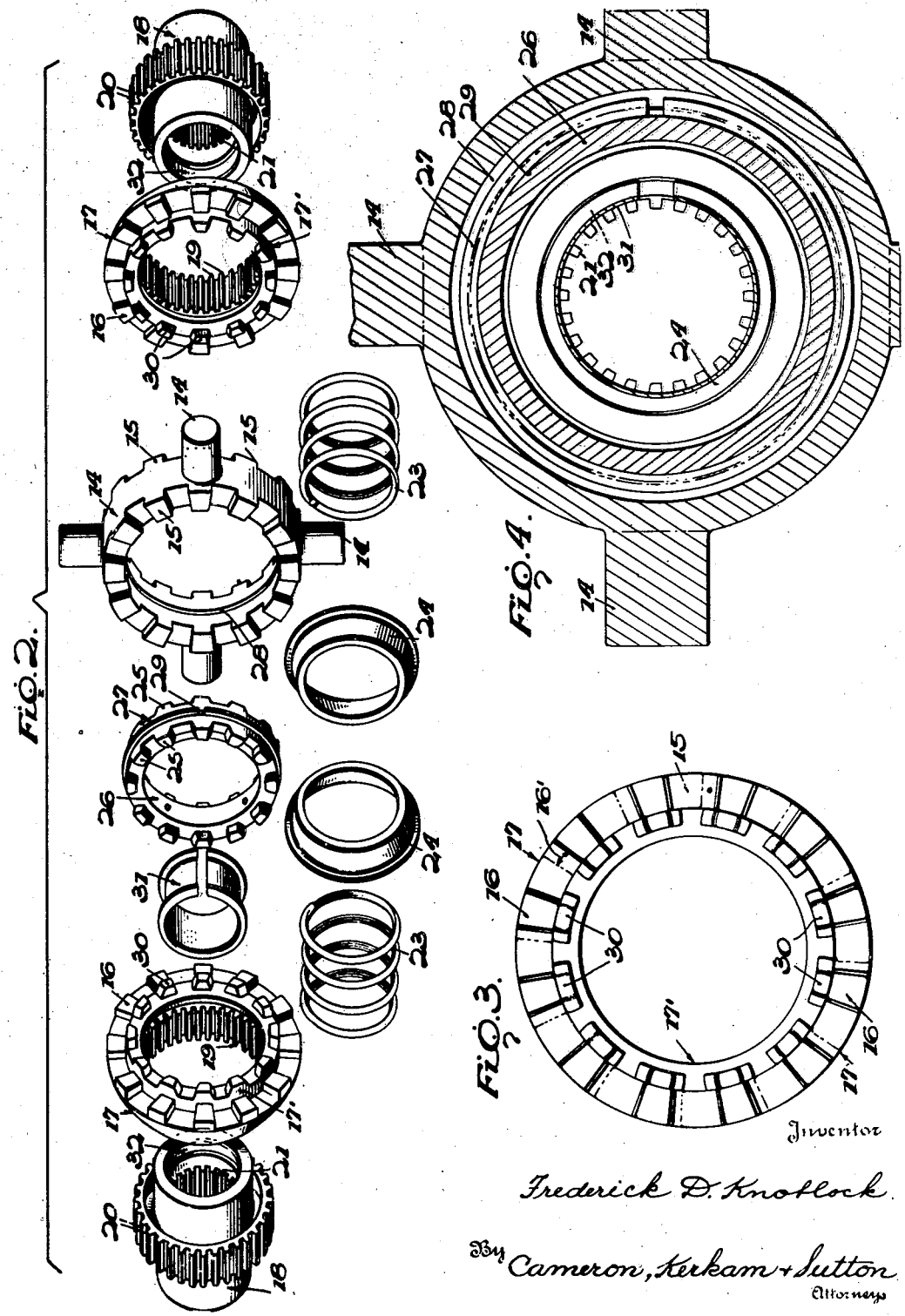

Patented Sept. 7, 1943

2,329,059

UNITED STATES PATENT OFFICE 2,329,059

DIFFERENTIAL MECHANISM

Frederick D. Knoblock, Birmingham, Mich., assignor, by mesne assignments, to Patent Developers, Inc., Detroit, Mich., a corporation of Michigan Application June 2, 1942, Serial No. 445,518

13 Claims. (Cl. 74—389.5)

The present invention is an improvement in differential or axle compensators for two opposed shafts.

One object of the invention is to simplify and improve the mounting of a clutch disengaging member provided with cam teeth within and to a central spider member, such mounting permitting relative rotational movement but not relative axial movement.

A second object is to improve the construction of the driven clutch member and simplify and facilitate its manufacture and joinder to a clutch disengaging member provided with cam teeth.

A third object is to associate the sleeves on which the driven members are mounted in such fashion that any axial thrust imparted to one during assembly on the shaft ends is immediately imparted to the other and transmitted to the differential housing.

A further object is the provision of means for holding the parts of the complete differential together during assembly by fastening the two sleeve members together.

The invention will be better understood by reference to the accompanying drawings, wherein Fig. 1 is a sectional view through the differential, the housing and ring gear being shown in dotted lines;

Fig. 2 is an exploded view of the parts of the differential;

Fig. 3 is a face view of one of the driven clutch members; and

Fig. 4 is a section on the line A—A of Fig. 1.

Figure 1:
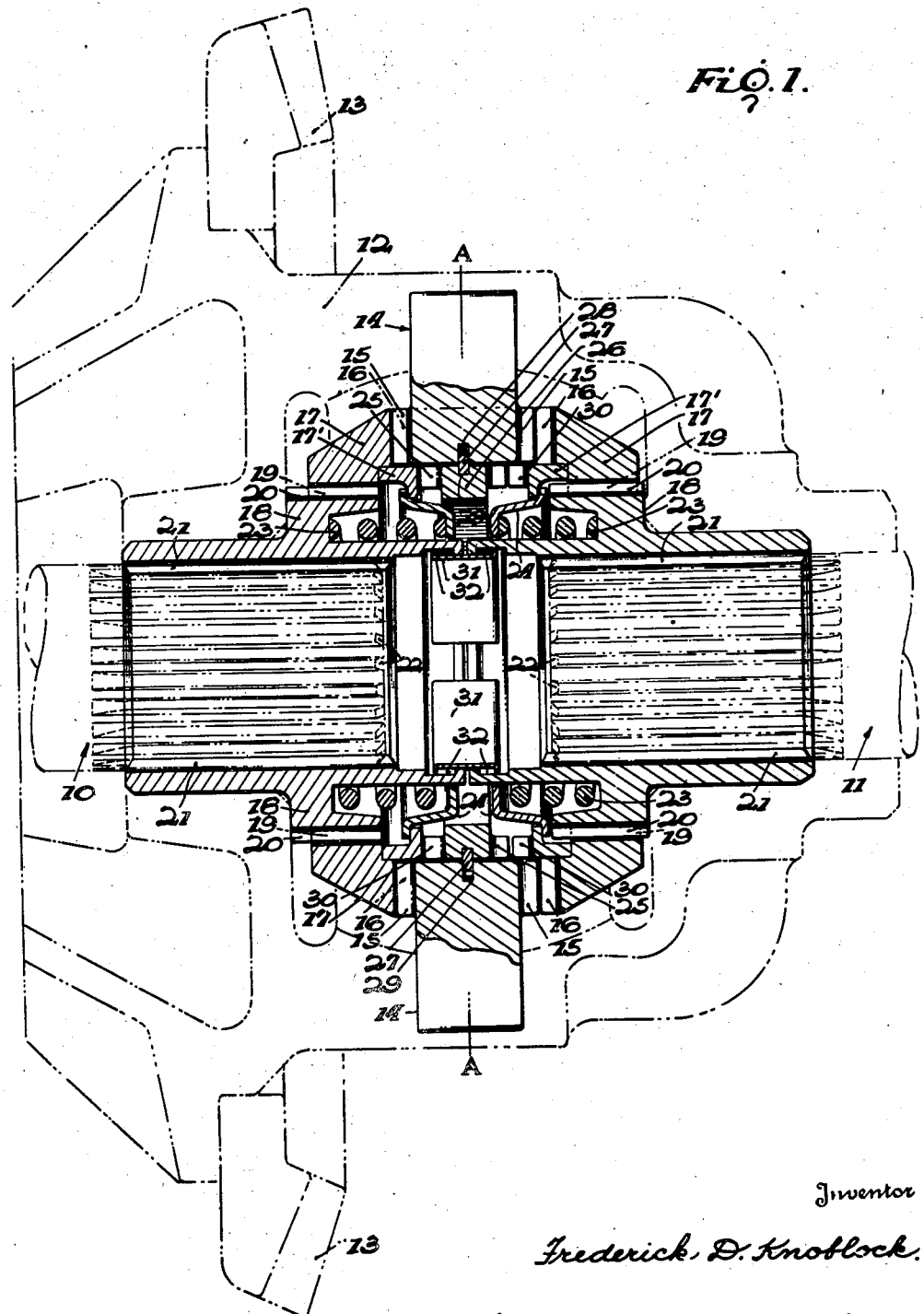

Referring to the drawings, wherein like reference numerals indicate like parts, 10 and 11 are adjacent ends of two opposed shafts on which the differential or compensator is mounted; and 12 is the casing or housing carrying the usual ring gear 13. A suitable driving member which is preferably a central spider 14 is mounted in the housing and rotates therewith. This spider is provided on each face with driving clutch teeth 15 that engage driven clutch teeth 16 formed on two driven clutch members 17 one of which is associated with the shaft 10 and the other with shaft 11. Each driven clutch member 17 is mounted on a sleeve 18 and is slidable therealong by the provision of splines 19 on the driven clutch members 17 engaging splines 20 on said sleeves 18. Sleeves 18 are preferably provided with a second set of splines 21 that engage splines 22 on shafts 10 and 11, though said sleeves may be keyed to said shafts or otherwise secured thereto.

The clutch disengaging operation is effected when there is relative speed between the two shafts 10 or 11 which causes one or the other of driven clutch members 17 to slide axially outward along its associated sleeve member 18, as shown in Fig. 1. This movement compresses one of the two coiled springs 23 which reacts between its associated sleeve 18 and spring retainer 24.

The clutch disengaging operation is effected by cam teeth 25 formed on a clutch disengaging member 26 mounted within the spider or driving clutch member 14. This clutch disengaging member 26 is rotatable relative to the spider or driven clutch member 14 but is prevented from axial movement relative thereto by suitable retaining means such as a snap ring 27 engaging a groove or recess 28 in spider 14 and a registering groove or recess 29 in clutch disengaging member 26. Such a removable connection between the driven clutch member 14 and the clutch disengaging member 26 not only facilitates production of the parts but their assembly and disassembly as well. The cam teeth 25 on the clutch disengaging member 26 engage cam teeth 30 on a part 17' of the driven clutch member 17, the coaction being such that when there is relative speed between the shafts 10 and 11 a declutching action is effected which operation is facilitated by a lost motion engagement between the clutch teeth 15 and 16 as indicated at 16', Fig. 3.

In order to simplify and cheapen the production of the driven clutch member 17 the part 17' thereof is independently produced and later welded to the driven clutch member 17, care being taken that the cam teeth 30 are indexed with driven clutch teeth 16. This separate formation of the part 17' enables the rapid and simple formation on the driven clutch members 17 of the clutch teeth 16 as well as the splines 19 which latter are arranged at substantially right angles to the clutch teeth. Further the member 17' provides bearing surfaces for the spring retainers 24.

As shown the sleeves 18 are provided with two sets of splines, 20 for the driven clutch member 17 and 21 for the shafts 10 and 11; and hence are simple and cheap in production. Since these sleeves 18 are in constant engagement with the driven clutch member 17 and not subject to the shock loads experienced by the latter, they can be made from a lower grade of steel. Further the interposition of the sleeves 18 between the shafts 10 and 11 and the driven clutch members 17 space the clutch teeth 16 farther from the center of the differential, which gives a greater pitch diameter, an increase in tooth-bearing area, lower bearing pressures, longer life, and improved performance.

The two sleeves 18 may be connected during assembly by any suitable means, the preferred one being a split ring 31 the marginal edges of which fit in grooves 32 in the juxtaposed inner ends of said sleeves, whereby the sleeves are held together at this time. This ring 31 consequently holds the entire differential assembly together during assembly because of the described association of the sleeves 18, driven clutch members 17, springs 23 and spring retainers 24. However after the differential has been assembled in the housing there is no end thrust on the ring 31 because of the clearance between the marginal edges of the same and the borders of the recesses 32. Further the sleeves 18 are associated so that during assmbly on the shafts 10 and 11 if undesired axial thrust should be imparted by a shaft 10 or 11 to one of the sleeves 18 the thrust would be immediately transmitted to the other sleeve 18 and thence to the differential housing, thus protecting the parts from injury.

The present construction provides a simple, efficient, cheap and durable axle differential or compensator that can be readily produced and assembled and disassembled.

It will be understood that while one embodiment of the inventive idea has been illustrated and described in detail such idea is susceptible of other mechanical embodiments within the scope of the appended claims.

What is claimed is:

1. In an axle differential for two opposed shafts, a housing, a driving member mounted within said housing and provided with driving clutch teeth on both side faces, a clutch disengaging cam member provided with cam teeth on both sides thereof mounted in said driving member, a snap ring connecting said cam member and driving member for relative rotational but not relative axial movement, and a driven clutch member associated with each set of driving clutch teeth and provided with driven clutch teeth to engage said driving clutch teeth and cam teeth to engage the teeth on said clutch disengaging member.

2. In an axle differential for two opposed shafts, a housing, a driving member mounted within said housing and provided with driving clutch teeth on both side faces said driving member having a recess, a clutch disengaging cam member provided with cam teeth on both sides thereof mounted in said driving member said clutch disengaging cam member having a similar recess, a snap ring housed in said recesses in said driving member and cam member and connecting said cam member and driving member for relative rotational but not relative axial movement, and a driven clutch member associated with each set of driving clutch teeth and provided with driven clutch teeth to engage said driving clutch teeth and cam teeth to engage the teeth on said clutch disengaging member.

3. In an axle differential for two opposed shafts, a housing, a driving clutch member mounted within said housing having clutch teeth on both faces, a clutch disengaging member mounted within said driving clutch member and having cam teeth on both faces, a driven clutch member on each side of said driving clutch member having driven clutch teeth engaging said driving clutch teeth, a cam member welded to said driven clutch member and having cam teeth indexed with said driven clutch teeth and engaging the cam teeth on said clutch disengaging member, a sleeve for each driven clutch member drivingly mounted on said shafts and having splines mating with splines on the driven clutch members, the clutch disengaging means becoming operative when there is relative speed between the two shafts.

4. In an axle differential for two opposed shafts, a housing, a driving clutch member mounted therein and having clutch teeth on both faces, a clutch disengaging member mounted within said driving clutch member and having cam teeth on both faces, means for connecting said driving clutch member and said clutch disengaging member for relative rotational movement only, a driven clutch member on each side of said driving clutch member having driven clutch teeth engaging said driving clutch teeth, a cam member welded to said driven clutch member and having cam teeth engaging the cam teeth on said clutch disengaging member, a sleeve for each driven clutch member mounted on said shafts and having splines mating with splines on the driven clutch members, spring means reacting between each sleeve and the cam member on said driven clutch member, the clutch disengaging means becoming operative when there is relative speed between the two shafts.

5. In an axle differential for two opposed shafts, a housing, a driving clutch member mounted therein and having clutch teeth on both faces, a clutch disengaging member mounted within said driving clutch member and having cam teeth on both faces, a driven clutch member on each side of said driving clutch member having driven clutch teeth engaging said driving clutch teeth, a cam member forming part of said driven clutch member and having cam teeth engaging the cam teeth on said clutch disengaging member, a sleeve for each driven clutch member having splines mating with splines on the driven clutch members, a spring retainer engaging each cam member, a spring reacting between each retainer and its associated sleeve, the clutch disengaging means becoming operative when there is relative speed between the two shafts.

6. In an axle differential for two opposed shafts, a housing, a driving clutch member in said housing having clutch teeth on both faces, a clutch disengaging member mounted within said driving clutch member and having cam teeth on both faces, a driven clutch member on each side of said driving clutch member having driven clutch teeth engaging said driving clutch teeth, a cam member welded to said driven clutch member and having cam teeth engaging the cam teeth on said clutch disengaging member, a sleeve for each driven clutch member having a splined connection to said shafts and splines mating with splines on the driven clutch members, the clutch disengaging means becoming operative when there is relative speed between the two shafts to force a driven clutch member axially outward along the splines on its sleeve against the compression of its associated spring.

7. In an axle differential for two opposed shafts, a housing, a driving clutch member in said housing having clutch teeth on both faces, a clutch disengaging member mounted within said driving clutch member and having cam teeth on both faces, a driven clutch member on each side of said driving clutch member having driven clutch teeth engaging said driving clutch teeth and cam teeth engaging the cam teeth on said clutch disengaging member and provided with splines at right angles to said driven clutch teeth, a sleeve for each driven clutch member having a splined connection to said shafts and splines mating with those on the driven clutch members, a coiled spring reacting between each sleeve and its associated driven clutch member, and clutch disengaging means operative when there is relative speed between the two shafts.

8. In an axle differential for two opposed shafts, a housing, a driving clutch member having clutch teeth on both faces, a driven clutch member on each side of said driving clutch member having driven clutch teeth engaging said driving clutch teeth and provided with splines at right angles to said driven clutch teeth, a sleeve for each driven clutch member having a splined connection to said shafts and splines mating with those on the driven clutch members, clutch disengaging means operative when there is relative speed between the two shafts, and means for holding the complete differential together during assembly into the housing by holding the two sleeves axially together.

9. In an axle differential for two opposed shafts, a housing, a driving clutch member having clutch teeth on both faces, a driven clutch member on each side of said driving clutch member having driven clutch teeth engaging said driving clutch teeth and provided with splines at right angles to said driven clutch teeth, a sleeve for each driven clutch member having a splined connection to said shafts and splines mating with those on the driven clutch members, each sleeve transmitting to the housing through direct engagement with the other sleeve any axial thrust imparted thereto, and clutch disengaging means operative when there is relative speed between the two shafts.

10. In an axle differetial for two opposed shafts, a housing, a spider mounted therein and rotatable therewith and provided with driving teeth, a clutch disengaging member mounted within said spider and having cam teeth on both faces, a pair of driven clutch members having driven teeth engaging said driving teeth and cam teeth engaging the cam teeth on said clutch disengaging member, a sleeve secured to each shaft on which sleeves the driven clutch members are mounted, a splined connection between said sleeves and driven clutch members and between said sleeves and shafts, a coiled spring reacting between each sleeve and its associated driven clutch member and being compressed in the outward axial movement of said driven clutch member, and a spring retainer for each spring bearing against said driven clutch member.

11. In an axle differential for two opposed shafts, a housing, a driving member mounted therein and rotatable therewith and provided with driving teeth, a clutch disengaging member mounted within said driving member and having cam teeth on both faces, a pair of driven clutch members having driven teeth engaging said driving teeth and cam teeth engaging the cam teeth on said clutch disengaging member, a sleeve secured to each shaft on which sleeves the driven clutch members are mounted, a splined connection between said sleeves and driven clutch members, a coil spring reacting between each sleeve and its associated driven clutch member and being compressed in the outward axial movement of said driven clutch member, and means for holding the differential in place during assembly into the housing by holding the two sleeves axially together.

12. In an axle differential for two opposed shafts, a housing, a spider mounted therein and rotatable therewith and provided with driving teeth, a clutch disengaging member mounted within said spider and having cam teeth on both faces, a pair of driven clutch members having driven teeth engaging said driving teeth and cam teeth engaging the cam teeth on said clutch disengaging member, a sleeve secured to each shaft on which sleeves the driven clutch members are mounted, a splined connection between said sleeves and driven clutch members, a coiled spring reacting between each sleeve and its associated driven clutch member and being compressed in the outward axial movement of said driven clutch member, and a split ring engaging grooves in the adjacent ends of said sleeves to hold the differential assembly in place during assembly into said housing.

13. In an axle differential for two opposed shafts, a housing, a spider mounted therein and rotatable therewith and provided with driving teeth, a clutch disengaging member mounted within said spider and having cam teeth on both faces, a pair of driven clutch members having driven teeth engaging said driving teeth and cam teeth engaging the cam teeth on said clutch disengaging member, a sleeve secured to each shaft on which sleeves the driven clutch members are mounted, a splined connection between said sleeves and driven clutch members and between said sleeves and shafts, a coiled spring reacting between each sleeve and its associated driven clutch member and being compressed in the outward axial movement of said driven clutch member, a spring retainer for each spring bearing against said driven clutch member, and means for holding the differential assembly in place by holding the two sleeves axially together during assembly into the housing.

FREDERICK D. KNOBLOCK.